(12) United States Patent
Spillman et al.

(10) Patent No.: US 11,819,772 B2
(45) Date of Patent: Nov. 21, 2023

(54) MODEL VEHICLE TURN SIGNAL METHOD AND SYSTEM

(71) Applicant: TRAXXAS, L.P., McKinney, TX (US)

(72) Inventors: Daryl Gene Spillman, Plano, TX (US); Brian Wan, Allen, TX (US); Kent Poteet, Lucas, TX (US)

(73) Assignee: TRAXXAS, L.P., McKinney, TX (US)

( * ) Notice: Subject to any disclaimer, the term of this patent is extended or adjusted under 35 U.S.C. 154(b) by 344 days.

(21) Appl. No.: 17/157,518

(22) Filed: Jan. 25, 2021

(65) Prior Publication Data

US 2021/0228995 A1    Jul. 29, 2021

Related U.S. Application Data

(60) Provisional application No. 62/965,249, filed on Jan. 24, 2020.

(51) Int. Cl.
| | |
|---|---|
| *A63H 17/32* | (2006.01) |
| *A63H 30/04* | (2006.01) |
| *A63H 17/28* | (2006.01) |
| *A63H 17/36* | (2006.01) |
| *G05D 13/62* | (2006.01) |

(52) U.S. Cl.
CPC .............. *A63H 17/32* (2013.01); *A63H 17/28* (2013.01); *A63H 17/36* (2013.01); *A63H 30/04* (2013.01); *G05D 13/62* (2013.01)

(58) Field of Classification Search
CPC ........ A63H 17/32; A63H 17/28; A63H 17/36; A63H 17/30; G05D 13/62
See application file for complete search history.

(56) References Cited

U.S. PATENT DOCUMENTS

| | | | | |
|---|---|---|---|---|
| 3,187,462 | A * | 6/1965 | Licitis ................... | A63H 19/22 446/439 |
| 5,713,783 | A * | 2/1998 | Szoke ................... | A63H 17/02 446/6 |
| 6,364,509 | B1 * | 4/2002 | Johnson, III .......... | A63H 17/32 446/175 |

(Continued)

FOREIGN PATENT DOCUMENTS

| | | | | |
|---|---|---|---|---|
| GB | 2026331 | A * | 2/1980 | ............. A63H 17/30 |
| GB | 2288987 | A * | 11/1995 | ............. A63H 17/36 |

*Primary Examiner* — Eugene L Kim
*Assistant Examiner* — Eugene M Hylinski
(74) *Attorney, Agent, or Firm* — Daryl R. Wright; Greg Carr (57) ABSTRACT

A method and system for activating and cancelling a first or second turn signal indicator for an R/C vehicle are provided. The method may include determining that the R/C vehicle is stationary and reading a rotation of a steering input to a stationary activation threshold. In addition, the method may include activating the turn signal indicator on a side of the R/C vehicle and setting an active turn signal indicator to on. Further actions in the method may involve determining that the R/C vehicle is in motion and reading a rotation of the steering input to a moving initiation threshold. Still further actions may include reading a rotation of the steering input in another direction to a moving cancellation threshold and deactivating the first or second turn signal indicator and setting the active turn signal indicator to off.

15 Claims, 6 Drawing Sheets

(56) References Cited

U.S. PATENT DOCUMENTS

| | | | | |
|---|---|---|---|---|
| 6,758,718 B1 * | 7/2004 | Morris | ............... | A63H 17/32 |
| | | | | 446/431 |
| 7,905,759 B1 * | 3/2011 | Ghaly | ............... | A63H 17/00 |
| | | | | 446/268 |
| 2010/0304640 A1 * | 12/2010 | Sofman | ............... | A63H 18/12 |
| | | | | 446/456 |

* cited by examiner

MODEL VEHICLE TURN SIGNAL METHOD AND SYSTEM

RELATED APPLICATIONS

This application claims the benefit of a related U.S. Provisional Application Ser. No. 62/965,249) filed Jan. 24, 2020, entitled "MODEL VEHICLE TURN SIGNAL METHOD AND SYSTEM," to Daryl Gene SPILLMAN et al., the disclosure of which is incorporated by reference herein in its entirety.

BACKGROUND

The following descriptions and examples are not admitted to be prior art by virtue of their inclusion in this section.

Model Vehicles, controlled through a radio link such as Radio Controlled (R/C) Cars, Planes, Trucks, and Boats, among others, have greatly evolved due to advances in technology, chemistry, and computer science. One area receiving the attention of R/C enthusiasts is the accurate duplication of full sized vehicles in both appearance and function. For scale model R/C enthusiasts, no functioning aspect of a full sized vehicle is off limits for duplication in the smaller, scale sized versions of the same vehicle. Functions such as brake lights, engine sounds, low beam and high beam headlights, and even miniature electronic winches have been developed and incorporated into R/C vehicles. Of course, this area continues to grow and evolve over time with additional features added to R/C vehicles.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An embodiment of the claimed disclosure may comprise a method for activating and cancelling a first or second turn signal indicator of an R/C vehicle using a turn signal controller. The method may comprise determining that the R/C vehicle is stationary and while stationary, further including reading a rotation in a first direction of a steering input at least to a stationary activation threshold. In addition, the method may include activating the first or second turn signal indicator on a corresponding first or second side of the R/C vehicle and setting an active turn signal indicator equal to on.

Further actions in the method may involve determining that the R/C vehicle is in motion and while in motion and while the active turn signal indicator equals on, reading a rotation in the first direction of the steering input at least to a moving initiation threshold. Still further actions may include reading a rotation in a second direction of the steering input at least to a moving cancellation threshold and deactivating the first or second turn signal indicator. In addition, setting the active turn signal indicator equal to off. Wherein a transmitter comprises the steering input and wherein rotation of the steering input produces a steering command transmitted from the transmitter to the R/C vehicle.

Another embodiment of the claimed disclosure may comprise a turn signal controller for an R/C vehicle including a data input port for receiving a steering command and a throttle command and a power output for activating a first or second turn signal devices. Wherein the first or second turn signal devices are activated and an active turn signal devices equals on when the throttle command corresponds to the R/C vehicle being stationary and the steering command corresponds to a steering input being rotated in a first direction at least to a stationary activation threshold.

A further embodiment of the claimed disclosure may comprise a method for operating a first or second turn signal indicator of an R/C vehicle via a turn signal control device that includes reading that a throttle command corresponds to the R/C vehicle being stationary and while stationary, reading a steering command corresponding to a rotation in a first direction of a steering input at least to a stationary activation threshold. Other actions of the method may include activating the first or second turn signal indicator on a corresponding first or second side of the R/C vehicle and setting an active turn signal indicator equal to on.

Other or alternative features will become apparent from the following description, from the drawings, and from the claims.

BRIEF DESCRIPTION OF THE DRAWINGS

Certain embodiments will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows.

DETAILED DESCRIPTION

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present disclosure. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

Moreover, inventive aspects lie in less than all features of a single disclosed embodiment. Thus, the claims following the Detailed Description are hereby expressly incorporated into this Detailed Description, with each claim standing on its own as a separate embodiment.

One area for development in increasing the realism of scale model Radio Controlled (R/C) vehicles is to implement functioning turn signal indicators. On a full size vehicle, there is a separate control stalk on the side of a steering wheel that is raised for activating the turn signal indicators on the right side of the vehicle, and lowered for activating the turn signal indicators on the left side of the vehicle. The control stalk interacts with the steering wheel to register when a turn has been made, and then cancels the activated turn signals.

Figure 1:
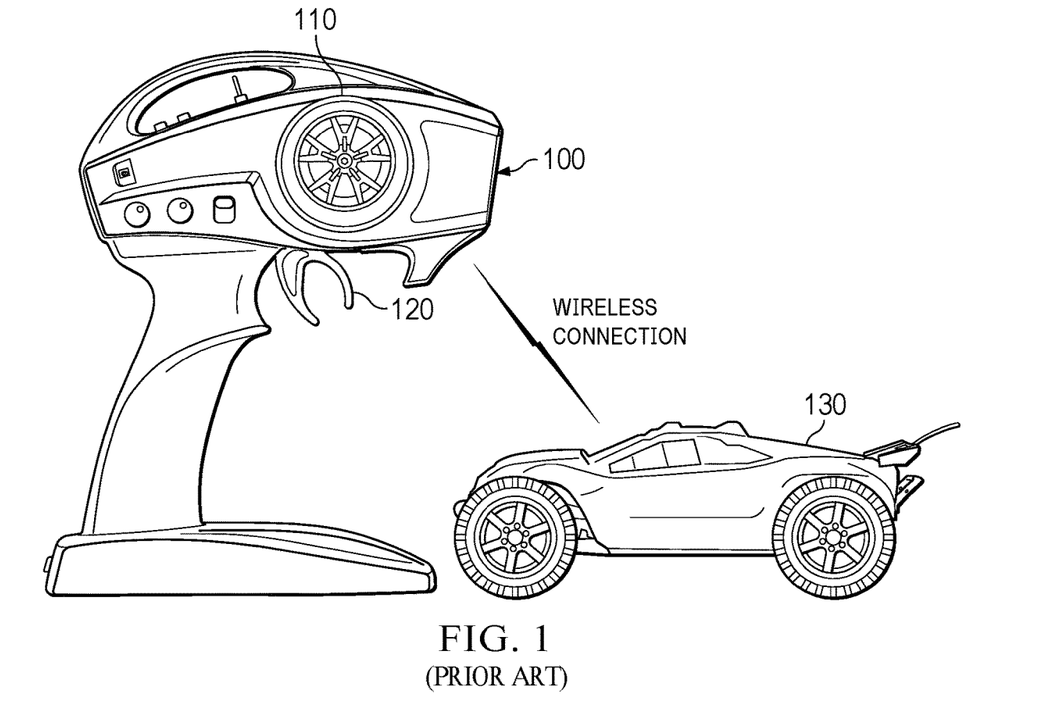
FIG. 1 is a PRIOR ART schematic illustration of a transmitter and R/C vehicle.

While turn signals are easily operated for a driver of a full sized vehicle, a scale model R/C vehicle lacks a control stalk to indicate which direction an R/C vehicle is intending to go. And while hand-held transmitters may be equipped with numerous buttons and or switches, embodiments of this disclosure are applicable with, but not limited to, a standard hand-held transmitter. Referring generally to FIG. 1, an R/C vehicle 130 may be controlled by a standard transmitter 100. The transmitter 100 comprises at least two user input devices for operating the R/C vehicle 130; a steering input 110 for applying steering commands or instructions and a throttle input 120 for applying throttle and braking commands or instructions.

The transmitter 100 will use these two user input devices (i.e., the steering input 110 and the throttle input 120 (e.g., the trigger)) to transmit signals to a receiver (not visible in this figure but located under the R/C vehicle body) located in an R/C vehicle 130. Through these two input devices, a user can remotely operate an R/C vehicle in the forward and reverse directions while turning left and right. In addition, the user can brake the R/C vehicle.

In many embodiments, there may be additional user input devices such as buttons, toggles, and rotating knobs, etc., to control other features of the R/C vehicle 130. In addition, a portable smart phone running an app may allow control of these and other features as well as providing a convenient way to display speed, angle, motor temperature, battery life, and light activation, etc. as determined by various sensors located on the R/C vehicle 130.

Figure 2:
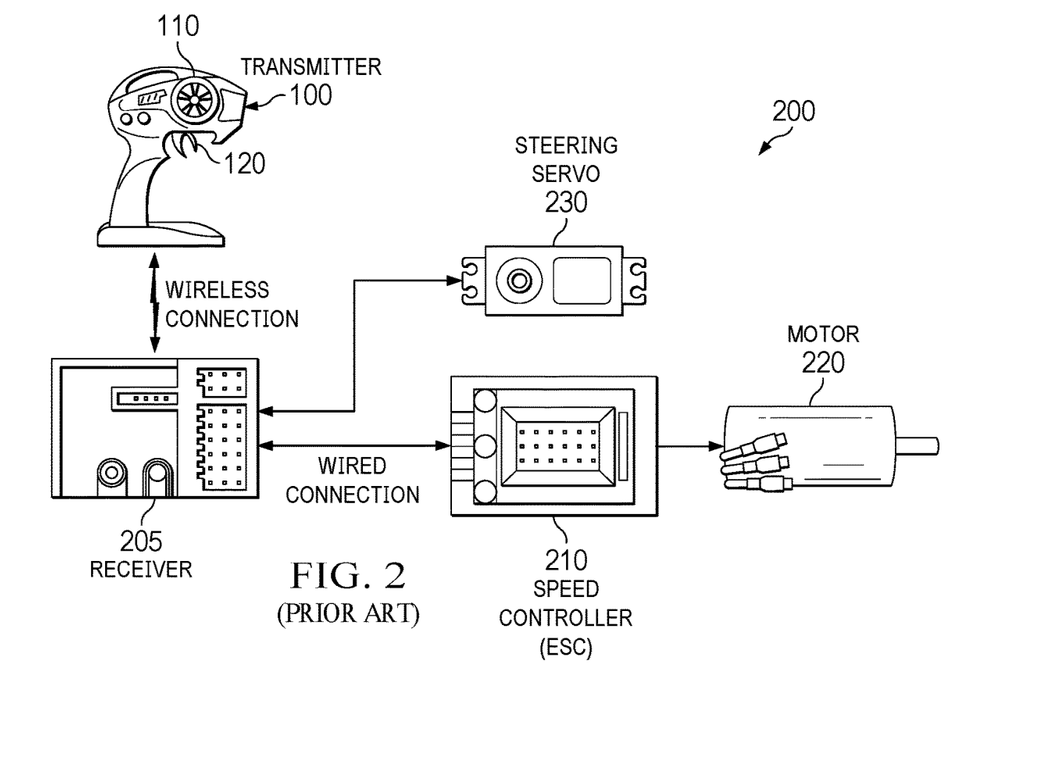
FIG. 2 is a PRIOR ART schematic illustration of a control mechanism including a transmitter and receiver.

Referring now to FIG. 2, a typical control system 200 for an R/C vehicle 130 comprises a hand-held transmitter 100, a receiver 205, an electronic speed controller (ESC) 210, a motor 220, and a steering servo 230. In some cases there may be multiple motors 220 and steering servos 230. The motor 220 may provide two wheel or four wheel drive for the R/C vehicle. The transmitter 100 accepts user input via the steering input 110 and the throttle input 120.

The user inputs (e.g., steering input and throttle input) are coded and transmitted over a wireless link to the receiver 205 as the user's steering and throttle commands. The receiver 205 is located in the R/C vehicle 130 (refer to FIG. 1).

The throttle commands are processed by the receiver 205 and sent to the ESC 210. The ESC 210 then provides electrical power (e.g., energy) from a source of stored energy such as one or more batteries (not shown) to energize the motor 220. These actions control the vehicle speed in either a forward or reverse direction.

A user actuates the throttle input 120 towards the transmitter 100 handle to command the R/C vehicle 130 to move forward. From this position, actuating the throttle input 120 past a center point or neutral point of rotation for the steering input 110 and away from the transmitter 100 handle will cause the R/C vehicle 130 to brake, usually using the motor 220 to provide the braking force.

Moving or actuating the throttle input 120 to the transmitter 100 handle to the center point of rotation and away again from the transmitter 100 handle will command the R/C vehicle 130 to drive the motor 220 in reverse. Using these actions, a single throttle input 120 is able to provide forward, braking, and reverse with one input device as opposed to multiple input devices for a full sized vehicle.

The steering commands are processed by the receiver 205 and sent to the steering servo 230, causing one or more wheels or sets of wheels to turn to the left or right (relative to the R/C vehicle 130) as intended by the user. These actions control a moving R/C vehicle's direction to the left or right. Although there is no requirement that the R/C vehicle needs to be moving in order for the wheels or sets of wheels to turn.

Figure 3:
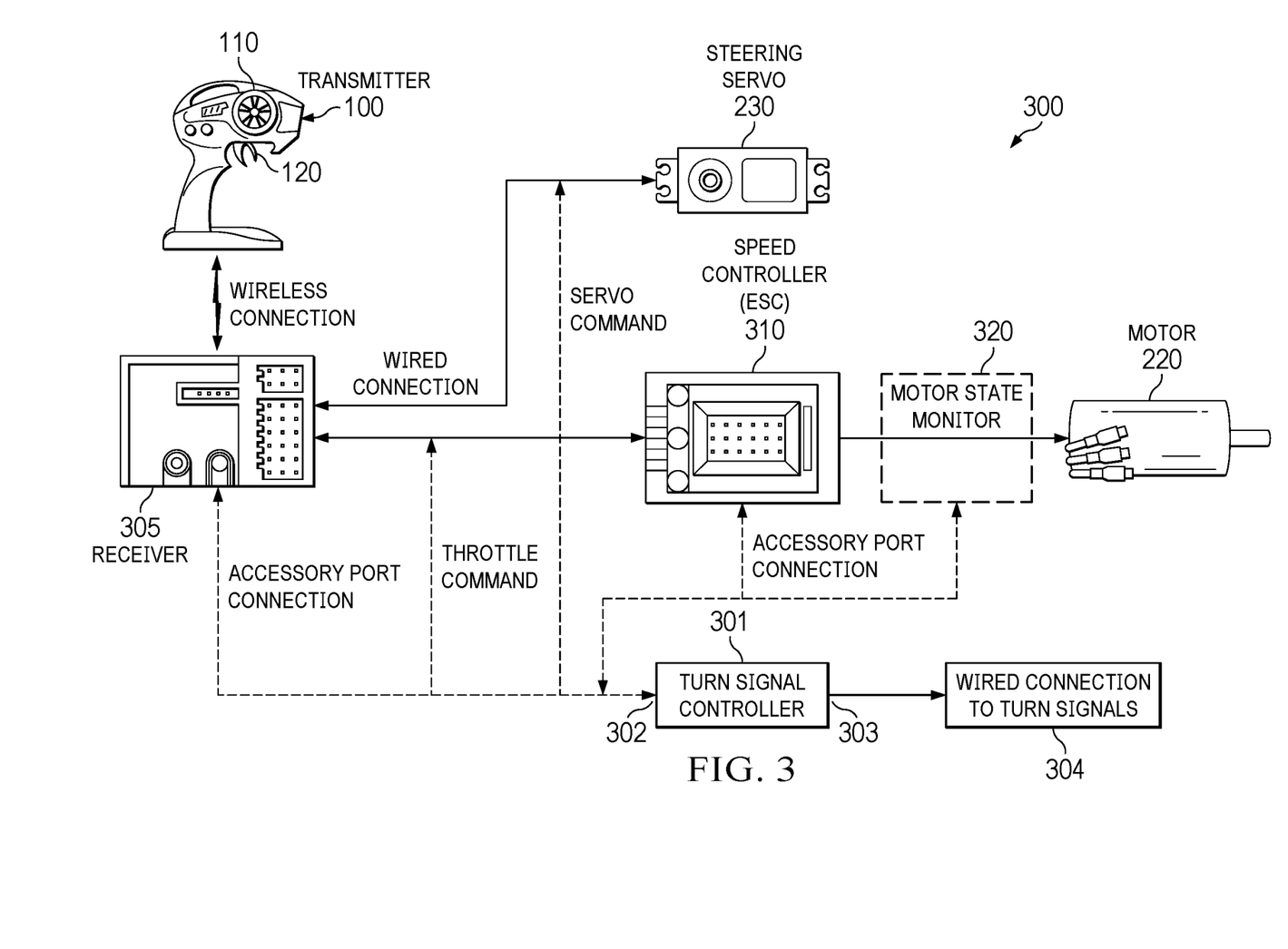
FIG. 3 is a schematic illustration of a control mechanism according to an embodiment of the disclosure.

In an exemplary embodiment of this disclosure, an additional component is added to the control mechanism 200 of FIG. 2. Referring generally to FIG. 3, a modified control mechanism 300 may comprise a turn signal controller 301 configured to control the operation of the turn signal indicators 304. The turn signal controller 301 may have a power output 303 for powering or activating the turn signal indicators 304. The rest of the modified control mechanism includes a transmitter 100, a receiver 305, an electronic speed control (ESC) 310, a motor 220, and a steering servo 230.

In order for a user to operate an R/C vehicle's turn signal indicators 304, the turn signal controller 301 may use two (2) pieces of information:
  whether or not the R/C vehicle is moving or stationary; and
  the direction and magnitude of a steering command The steering command and the R/C vehicle's motion information may be obtained in a variety of ways. For example, in some embodiments, the steering command (i.e., corresponding to the amount and direction of the rotation of the steering input 110 of the transmitter 100) may be read or obtained from the receiver's 305 wired connection to the steering servo 230 (see the Servo Command broken line). The steering command signals may be detected in the wired connection via a splice, wiretap, soldering an additional wire to an existing terminal, or some other means of modification. The steering command is input for interpretation into the turn signal controller via a data input 302.

In other embodiments, either one or both of the receiver 305 or the ESC 310 may further comprise an accessory port allowing for a direct plug-in electrical connection between the receiver 305 or the ESC 310 and the data input 302 of the turn signal controller 301, without requiring any additional physical modification of the control mechanism 300. For example, these accessory ports are provided in Traxxas LP's (Traxxas Stability Management) TSM receivers or VXL ESC's. An accessory port may provide information (e.g., data), power, or both.

The information regarding the motion of the vehicle (i.e., whether or not the vehicle is moving or stationary) may be read or obtained in some embodiments from the wired connection between the receiver 301 and the ESC 310 (see the Throttle Command broken line). The throttle command signals traverse the wired connection from the receiver 301 to the ESC 310 and may be read via a splice, wiretap, soldering an additional wire to an existing terminal, or some other means of modification. The throttle command may also be inputted for interpretation into the turn signal controller via the data input 302

While in still other embodiments, the vehicle's motion information may be obtained from an optional motor state monitor 320 that monitors the motor commands or current flow or voltage level or power level or amount of energy transmitted from the ESC 310 to the motor 220. In some cases, determining whether or not a vehicle is moving may be as simple as detecting whether or not there is a current or power flow between the ESC 310 and the motor 220. While in other cases, the motor state monitor 320 may detect whether or not the motor 220 is energized.

In some embodiments the vehicle's motion information may be obtained by determining if an R/C vehicle's brake lights are activated and back-up or reversing lights are not activated. In such a case, the throttle input 120 would provide a throttle command corresponding to braking. Typically, as stated earlier, pulling the throttle input 120 (i.e., towards the transmitter 100 handle) from a neutral or center point 105 position provides forward propulsion. When the R/C vehicle is in motion, pushing the throttle input 120 (i.e., away from the transmitter 100 handle) past a neutral or center point position 105 provides braking force.

However, if the throttle input 120 is pushed from a neutral or center point 105 after the wheels of the R/C vehicle 130 have stopped rotating, then the R/C vehicle 130 will reverse. In most embodiments there should be some forward motion of the R/C vehicle 130 detected when the throttle input 120 is pushed past a neutral or center point 105 position in order to activate the brakes.

In addition, as described with the steering command, the throttle command may be obtained from the receiver's optional accessory port (if so equipped) or the ESC's optional accessory port (if so equipped) via a plug-in electrical connection reversibly coupling the receiver and the ESC to the turn signal controller 301. The accessory ports, if so equipped, allow implantation of a turn signal controller 301 without additional modification of the control mechanism 300.

While the turn signal controller 301 is illustrated in this exemplary embodiment as a separate device with physical connections to either the receiver 305 or the ESC 310, in some embodiments the functionality of the turn signal controller 301 may be incorporated along with the rest of the electronics of these two systems. Of course, in such an embodiment, there may not be reversible electrical connections and in some cases physical components may be duplicated as software functionality.

Figure 4A:
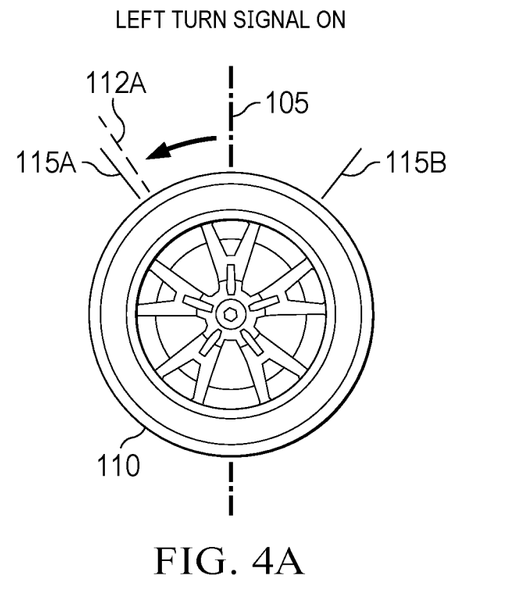
FIGS. 4A and 4B are schematic illustrations of a steering input for activating a left and right turn signal indicator respectively, according to an embodiment of the disclosure.
Figure 4B:
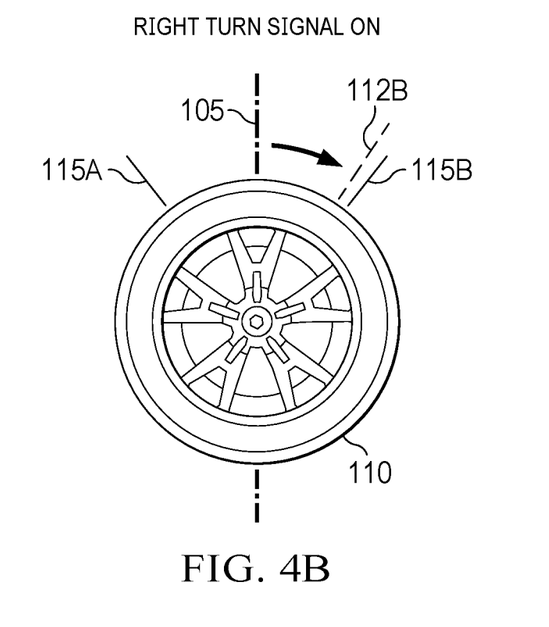

Turning now to illustrative FIGS. 4A and 4B, the steering input 110 may be turned in a clockwise or counter clockwise direction between two rotation limits, rotation limit 115A in the counter clockwise direction, and rotation limit 115B in the clockwise direction. When released, the steering input 110 may be resiliently biased back to a neutral or center point position 105 between the two rotation limits 115A, 115B and corresponding to the wheel or set or wheels of the R/C vehicle being oriented for straight motion in a forward or reverse direction.

In an illustrative embodiment, activating the turn signal indicators involves rotating the steering input 110 at least to a defined stationary activation threshold when the R/C vehicle is stopped or stationary. In this example, the stationary activation threshold is at 112A (90% of the counter clockwise rotation limit 115A) for implementing a left turn signal indicator (see FIG. 4A), and at 112B (90% of the clockwise rotation limit for 115B) for implementing a right turn signal indicator (see FIG. 4B).

Of course, the stationary activation thresholds 112A, 112B for this example are for illustrative purposes only. Other stationary activation thresholds could be at the rotation limits 115A, 115B, or at any percentage of these limits, although, in order to prevent inadvertent activation of the turn signal indicators, the percentage may be above 50%. However, in some embodiments if there is an intention to increase the ability to easily activate the turn signal indicators, lower percentages such as 75% or higher of the rotation limits 115A, 115B may be used, among others, to establish stationary activation thresholds 112A, 112B. The percentages are given for illustrative purposes, a person of skill in the art may use other applicable percentages depending upon the application.

When the R/C vehicle is stopped and the steering input 110 is rotated at least to the stationary activation threshold 112A, 112B, in an intended direction, the turn signal indicator will be activated, setting the active turn signal indicator to on and creating an active turn signal indicator (i.e., intermittent illumination of tail and/or front parking lights on one side of the R/C vehicle), for indicating a turn in that direction. The steering input 110 can then be released to resiliently rotate back to neutral or the center point 105 or manually rotated below the activation threshold 112A, 112B. The active turn signal indicator will remain active and the active turn signal indicator will be equal to on as long as the steering input 110 is not rotated past a stationary cancellation threshold (detailed later).

Figure 5A:
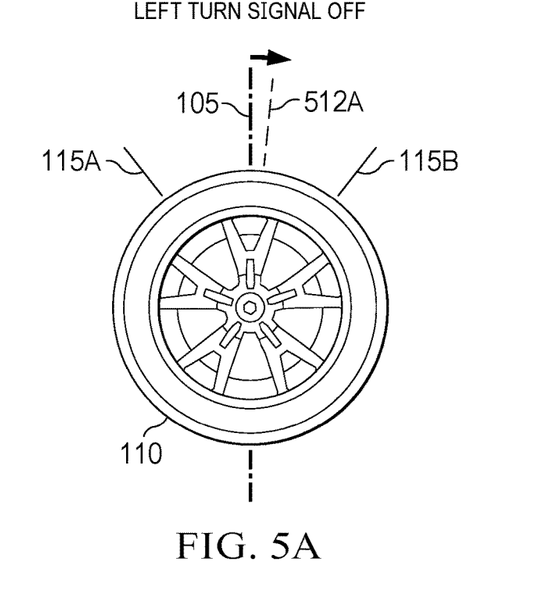
FIGS. 5A and 5B are schematic illustrations of a steering input for cancelling a left and right active turn signal indicator respectively for a motionless R/C vehicle, according to an embodiment of the disclosure.
Figure 5B:
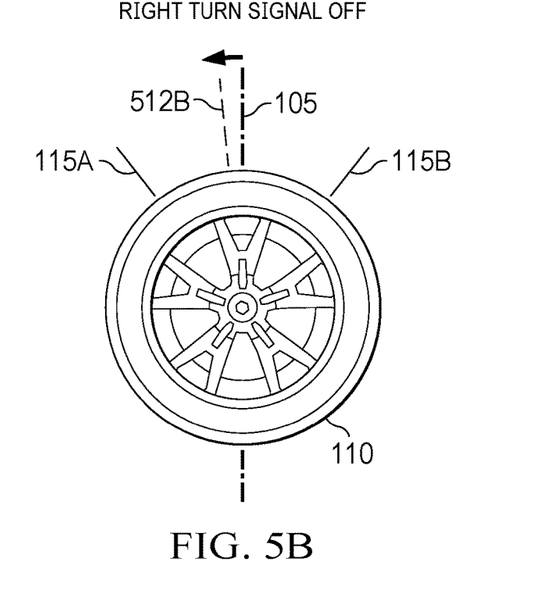

In some embodiments, if the user changes their mind and decides to deactivate or cancel the active turn signal indicator, while the vehicle is stationary or motionless, the steering input 110 may be turned at least to a stationary cancellation threshold 512A, 512B (see FIGS. 5A and 5B). In some embodiments, the stationary cancellation threshold 512A, 512B for a corresponding stationary activation threshold 112A, 112B will be on opposite sides of the neutral or center point 105 of the steering input 110 from one another.

In most of the embodiments, the neutral or center point 105 of the steering input 110 may not be selected as a stationary cancellation threshold 512A, 512B, since the steering input 110 returns to this position naturally due to resilient biasing of the steering input 110. However, stationary cancellation thresholds 512A, 512B may be established at 2.5% of the rotation limits 115A, 115B off (for example, or a lessor or greater percentage) past the neutral or center point 105 from the corresponding stationary activation thresholds 112A, 112B (i.e., on the opposite side of the neutral or center point 105 from the corresponding stationary activation thresholds 112A, 112B).

For example, rotating the steering input 110 to stationary cancellation threshold 512A will set the active turn signal indicator to off and cancel an active turn signal indicator activated by the stationary cancellation threshold 112A. Other percentages of the rotation limits 115A, 115B may be used as appropriate for facilitating the operation of cancelling an active turn signal indicator while the vehicle is stationary and setting the active turn signal indicator to off.

As an illustrative example, assume that a user intends to indicate a left turn. When the R/C vehicle is stopped, the user rotates the steering input 110 in a first direction, in this case, a counter clockwise direction, past the activation threshold 112A and then releases the steering input 110 (see FIG. 4A). The steering input 110 then returns to neutral or the center point 105. The left turn signal indicator is activated and indicated on the left side of the R/C vehicle via flashing or sequential lights, trafficators, arrows, or other manners of indicating a turn. Activation of the left turn signal indicator results in the active turn signal indicator being set to on.

In addition to the traditional blinking (i.e., alternating between illumination and no illumination) of a red or amber (among other colors as appropriate) parking light on the front, a side light, or a red or amber taillight on the rear of an R/C vehicle as an active turn signal indicator, a person of skill in the art would recognize the application of many of the embodiments of this disclosure to include recent or currently unknown developments such as sequential blinking of separated lights and smoother, more integrated dynamic sequential lights. As advances in LED lighting and technology improve, other applicable embodiments of turn signal indicators may be developed and fall into the scope of this disclosure.

Previous embodiments have described manually cancelling an active turn signal indicator for a stationary R/C vehicle. However, in some embodiments, active turn signal indicators can be cancelled or deactivated similar in part to full sized vehicles via the steering input 110 and determining that an R/C vehicle is in motion (i.e., forward or reverse). In full sized vehicles turning the steering wheel in the direction of the indicated turn causes the steering wheel to initially interact with the turn signal control stalk. Once the turn is completed, the steering wheel is rotated in the opposite direction and the motion of the steering wheel cancels an active turn signal indicator.

Figure 6A:
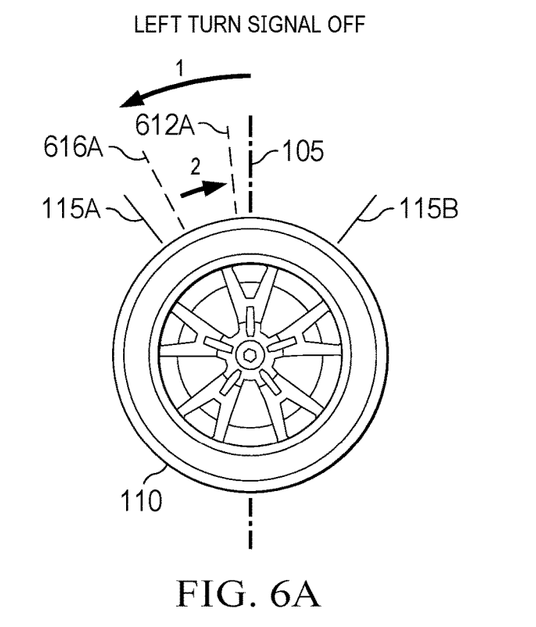
FIGS. 6A and 6B are schematic illustrations of a steering input for cancelling a left and right active turn signal indicator respectively for an R/C vehicle in motion, according to an embodiment of the disclosure.
Figure 6B:
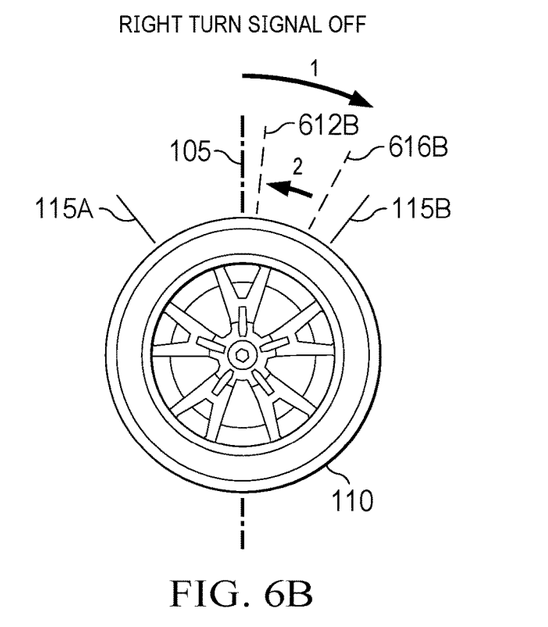

As there is no control stalk, exemplary embodiments of this disclosure have developed a way for a user to cancel an active turn signal indicator while the R/C vehicle is moving. Referring generally to FIGS. 6A and 6B, for a moving R/C vehicle, the user needs to rotate the steering input 110 in a first direction, the direction of the turn, past a moving initiation threshold 616A, 616B. The moving initiation threshold is on the same side of the steering input 110 as the corresponding activation threshold 112A, 112B for the active turn signal indicator.

A user steering a moving R/C vehicle around a corner will usually turn the steering input 110 in the direction of the turn. Accordingly, rotating the steering input 110 at least to the appropriate moving initiation threshold 616A, 616B, is a relatively natural action depending upon the radius of curvature of the corner. While the R/C vehicle is traversing a turn, for the sake of description, it will be assumed that the steering input 110 is rotated at least to the moving initiation threshold 616A, 616B.

Reaching the moving initiation threshold 616A, 616B, will not cancel or deactivate the active turn signal indicator. Just as in a full sized vehicle, the driver turns in the direction of the indicated turn and drives through the corner. As the car and driver are travelling through the corner, the steering wheel remains rotated and the active turn signal indicators continue to be activated or implemented. Only after the driver rotates the steering wheel back towards the neutral or center point will the turn signal be cancelled.

After the moving initiation threshold 616A, 616B is reached, the steering input 110 is then rotated in the opposite direction until at least reaching a moving cancellation threshold 612A, 612B. In some cases, the moving cancellation threshold 612A, 612B may be 5% to 10% of a rotation limit 115A, 115B, for example, among other percentages appropriate for their application. Embodiments of the moving cancellation threshold 612A, 612B are below (i.e., closer to neutral or the center point 105) the corresponding moving initiation threshold 616A, 616B.

Some embodiments may establish moving initiation thresholds 616A, 616B at a percentage (13%, 20% or 25%, among others) of a corresponding rotation limit 115A, 115B. The moving cancellation threshold 612A, 612B may also be at a percentage (−5%, 5%, 10%, and 12.5%, among others) of the same corresponding rotation limit 115A, 115B, but in all cases, lower than the moving initiation threshold 616A, 616B. In some cases, the moving cancellation threshold 612A, 612B may be established at the neutral or center point 105 or even into the opposing side of the center point 105.

Still other embodiments may have a moving initiation threshold 616A, 616B and a moving cancellation threshold 612A, 612B be at the same percentage of a corresponding rotation limit 115A, 115B. In such a case, a steering input 110 would go in in a first direction and reach or go past a moving initiation threshold 616A, 616B. The activated turn signal indicator would be cancelled and the active turn signal indicator set to off when the steering input 110 goes past or below moving cancellation threshold 612A, 612B. In this case, the moving cancellation threshold 612A, 612B would have to be passed in order to cancel the active turn signal indicator since the moving initiation threshold 616A, 616B and the moving cancellation threshold 612A, 612B are the same.

Although the turn signal controller 301 is shown as a separate component in FIG. 3, this is for the purposes of illustrating an exemplary embodiment in which turn signal capabilities are added to an R/C Vehicle. In some embodiments, the turn signal controller 301 may be integrated into a receiver or ESC. In these embodiments, the receiver or ESC would include connections for powering the turn signal indicators.

Figure 7:
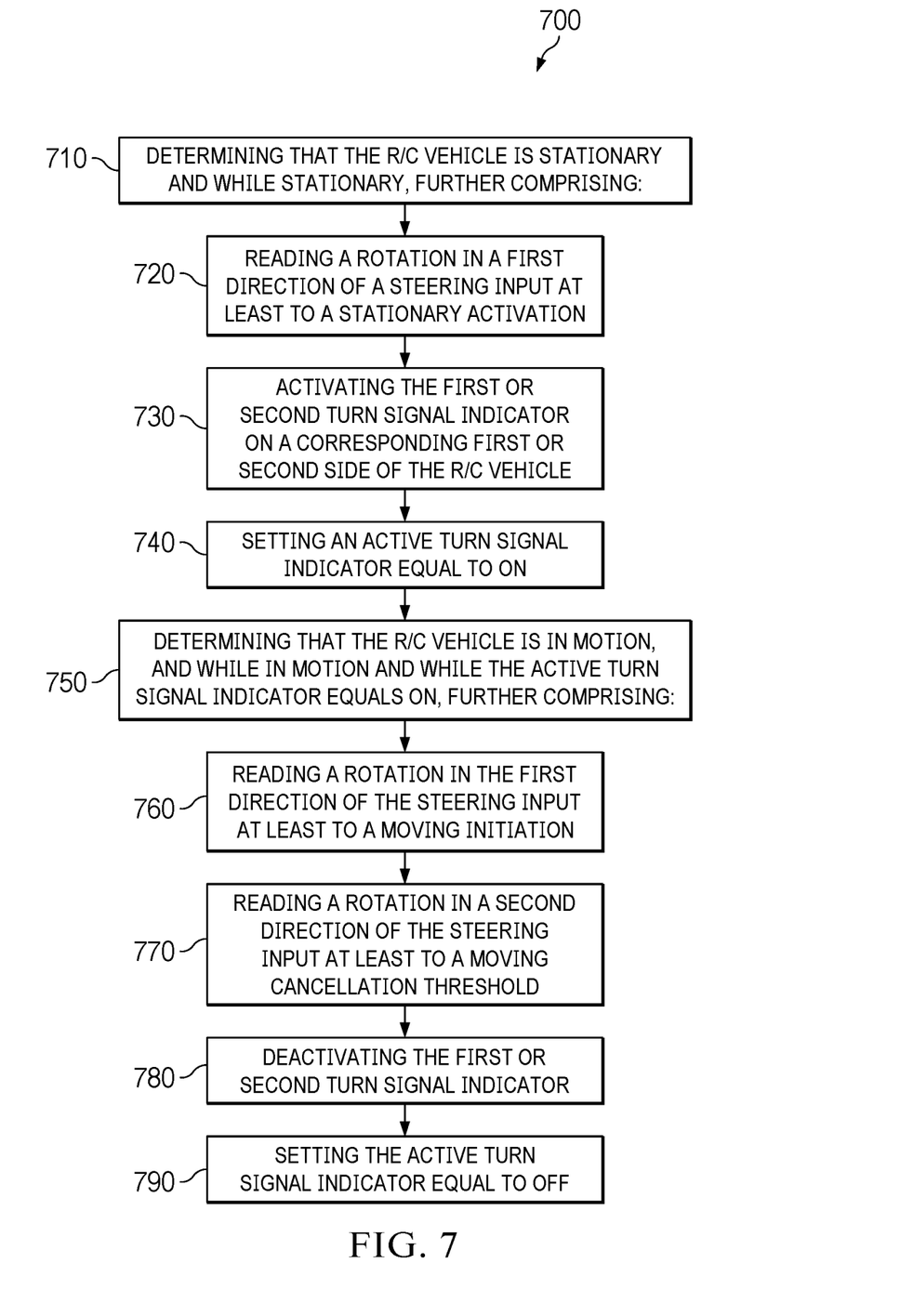
FIG. 7 is a schematic flowchart of a method of activating and cancelling a turn signal indicator of an R/C vehicle using a turn signal controller, according to an embodiment of the disclosure.

Referring to FIG. 7, another embodiment of the current disclosure is a method for activating and cancelling a first or second turn signal indicator of an R/C vehicle using a turn signal controller 700. The method includes determining that the R/C vehicle is stationary 710 and while stationary, further comprising reading a rotation in a first direction of a steering input at least to a stationary activation threshold 720, activating the first or second turn signal indicator on a corresponding first or second side of the R/C vehicle 730, and setting an active turn signal indicator equal to on 740.

In addition, the method further includes determining that the R/C vehicle is in motion, and while in motion and while the active turn signal indicator equals on 750, further comprising reading a rotation in the first direction of the steering input at least to a moving initiation threshold 760, reading a rotation in a second direction of the steering input at least to a moving cancellation threshold 770, deactivating the first or second turn signal indicator 780, and setting the active turn signal indicator equal to off 790. In addition the method further comprises wherein a transmitter comprises the steering input, and wherein rotation of the steering input produces a steering command transmitted from the transmitter to the R/C vehicle.

Figure 8:
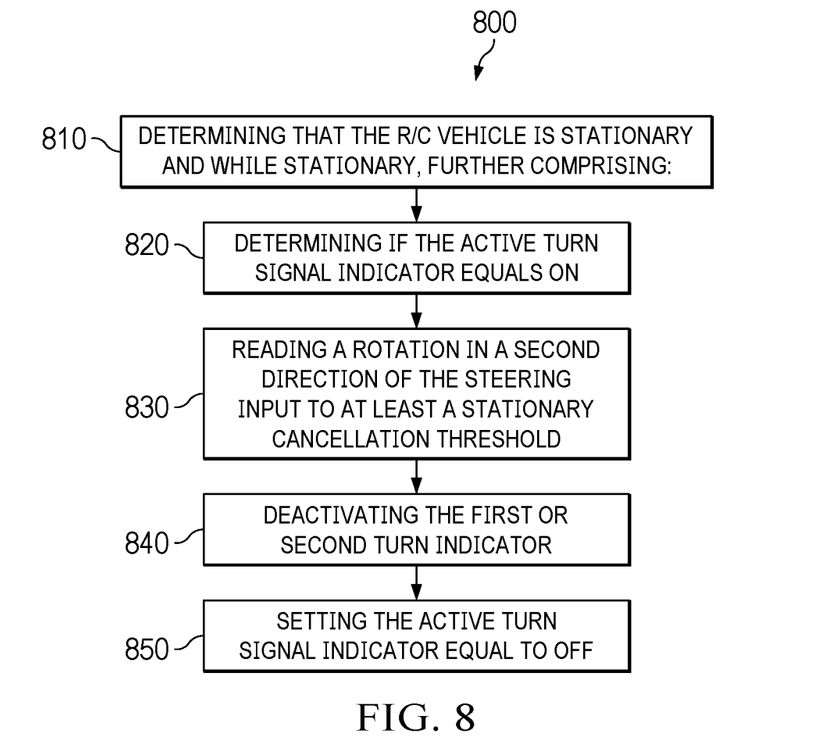
FIG. 8 is a schematic flowchart of the method of FIG. 7 while the R/C vehicle is stationary and cancelling a turn signal indicator, according to an embodiment of the disclosure.

Referring generally to FIG. 8, another schematic flowchart 800 illustrating an embodiment that includes the previously described method, and while stationary 810 further comprises determining if the active turn signal indicator equals on 820. If the active turn signal indicator equals on, the method includes reading a rotation in a second direction of the steering input to at least a stationary cancellation threshold 830, deactivating the first or second turn indicator 840, and setting the active turn signal indicator equal to off 850.

An additional embodiment may include a method for operating a first or second turn signal indicator of an R/C vehicle via a turn signal control device. The method may include reading a throttle command that corresponds to the R/C vehicle being stationary. While stationary, the method may include reading a steering command corresponding to a rotation in a first direction of a steering input at least to a stationary activation threshold, activating the first or second turn signal indicator on a corresponding first or second side of the R/C vehicle, and setting an active turn signal indicator equal to on.

A still further embodiment may include the actions of the method most previously described and while stationary, further include reading a steering command corresponding to a rotation in a second direction of the steering input past a stationary cancellation threshold, deactivating the first or second turn signal indicator, and setting the active turn signal indicator equal to off.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for activating and cancelling a first or second turn signal indicator of a radio controlled vehicle using a turn signal controller and comprising:
    determining that the radio controlled vehicle is stationary and while stationary, further comprising:
        reading a rotation in a first direction of a steering input at least to a stationary activation threshold;
        activating the first or second turn signal indicator on a corresponding first or second side of the radio controlled vehicle;
        setting an active turn signal indicator equal to on;
    determining that the radio controlled vehicle is in motion, and while in motion and while the active turn signal indicator equals on, further comprising:
        reading a rotation in the first direction of the steering input at least to a moving initiation threshold;
        reading a rotation in a second direction of the steering input at least to a moving cancellation threshold;
        deactivating the first or second turn signal indicator;
        setting the active turn signal indicator equal to off;
    wherein a transmitter comprises the steering input; and
    wherein rotation of the steering input produces a steering command transmitted from the transmitter to the radio controlled vehicle.

2. The method of claim 1, wherein determining that the radio controlled vehicle is stationary and while stationary, further comprising:
    determining if the active turn signal indicator equals on, further comprising:
        reading a rotation in a second direction of the steering input to at least a stationary cancellation threshold;
        deactivating the first or second turn indicator;
        setting the active turn signal indicator equal to off.

3. The method of claim 2, wherein the stationary cancellation threshold is within 10% of a rotation limit past a center point of rotation of the steering input in the second direction.

4. The method of claim 1, wherein determining that the radio controlled vehicle is stationary is via a motor state monitor detecting an energization of a motor.

5. The method of claim 1 wherein activating the first or second turn signal indicator on the corresponding first or second side of the radio controlled vehicle is an intermittent illumination of a first or second taillight on the corresponding first or second side of the radio controlled vehicle.

6. The method of claim 1 wherein activating the first or second turn signal indicator on the corresponding first or second side of the radio controlled vehicle is an intermittent illumination of a first or second series of taillights on the corresponding first or second side of the radio controlled vehicle.

7. The method of claim 1 wherein activating the first or second turn signal indicator on the corresponding first or second side of the radio controlled vehicle is an intermittent illumination of a first or second taillight and a corresponding first or second front parking light on the corresponding first or second side of the radio controlled vehicle.

8. The method of claim 1 wherein the determining that the radio controlled vehicle is stationary is via a wiretap of a wired connection coupling a receiver to an electronic speed controller and detection of a throttle command requesting zero energy be provided to a motor.

9. The method of claim 1 wherein the moving initiation threshold is equal to the moving cancellation threshold.

10. A method for operating a first or second turn signal indicator of a radio controlled vehicle via a turn signal control device and comprising:
    reading a throttle command that corresponds to the radio controlled vehicle being stationary and while stationary, further comprising:
        reading a steering command corresponding to a rotation in a first direction of a steering input at least to a stationary activation threshold;
        activating the first or second turn signal indicator on a corresponding first or second side of the radio controlled vehicle; and
        setting an active turn signal indicator equal to on.

11. The method of claim 10 further comprising:
    reading that a throttle command that corresponds to the radio controlled vehicle in motion and while in motion and while the active turn signal indicator equals on, further comprising:
        reading a steering command corresponding to a rotation in the first direction of the steering input at least to a moving initiating threshold;
        reading a steering command corresponding to a rotation in a second direction of the steering input at least to a moving cancellation threshold;
        deactivating the first or second turn indicator; and
        setting the active turn signal indicator equal to off.

12. The method of claim 10 wherein while stationary and while the active turn signal indicator is on further comprising:
  reading a steering command corresponding to a rotation in a second direction of the steering input past a stationary cancellation threshold;
  deactivating the first or second turn signal indicator; and
  setting the active turn signal indicator equal to off.

13. The method of claim 12 wherein the stationary cancellation threshold corresponds to the steering command corresponding to a rotation in the second direction of the steering input past a center point of rotation by at least 10%.

14. The method of claim 10 wherein the first or second turn signal indicator comprises an intermittent illumination of a corresponding first or second taillight on a corresponding first or second side of the radio controlled vehicle.

15. The method of claim 10 wherein one of the reading the throttle command or reading the steering command is via a wiretap.

* * * * *